UNITED STATES PATENT OFFICE.

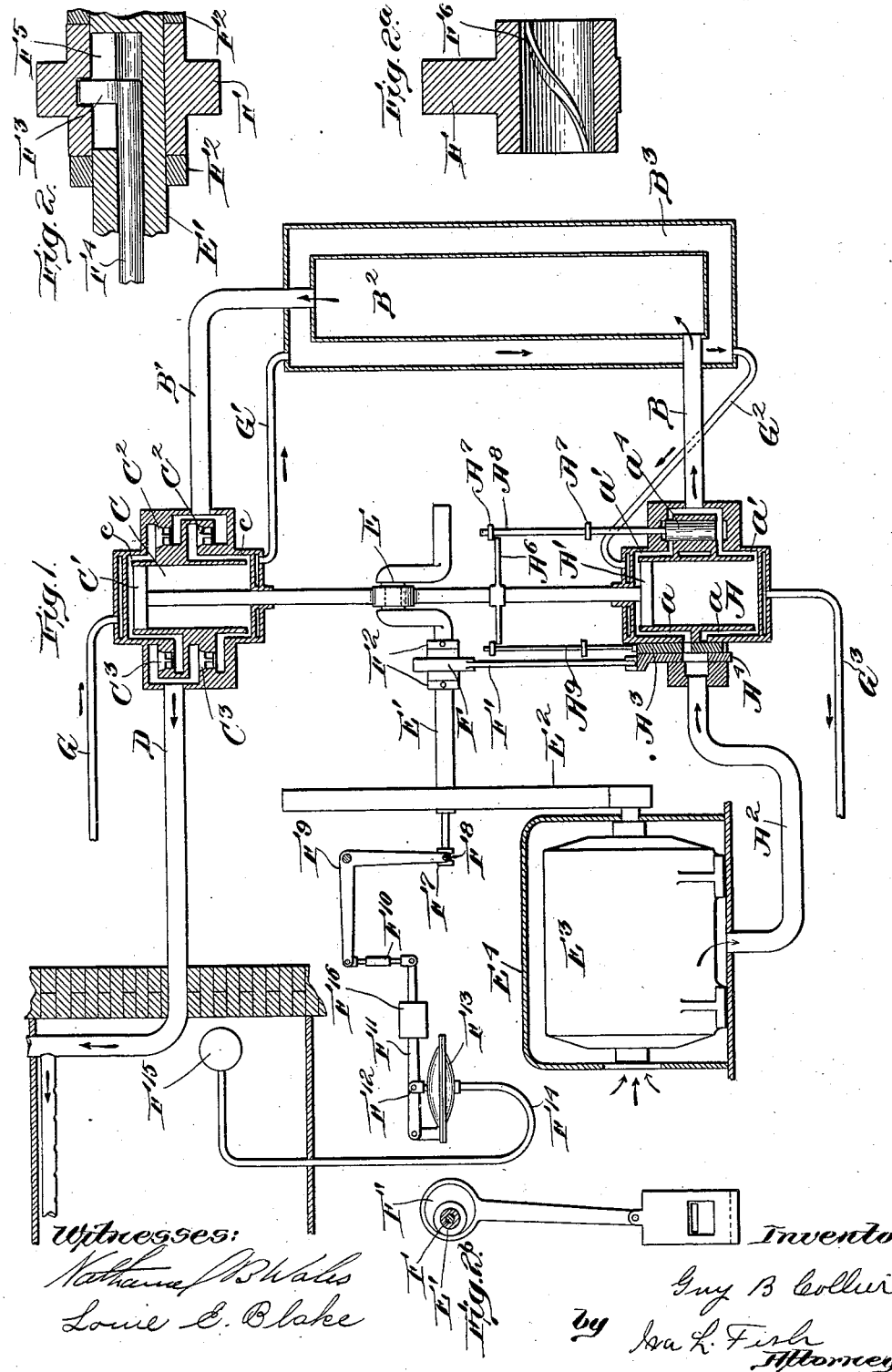

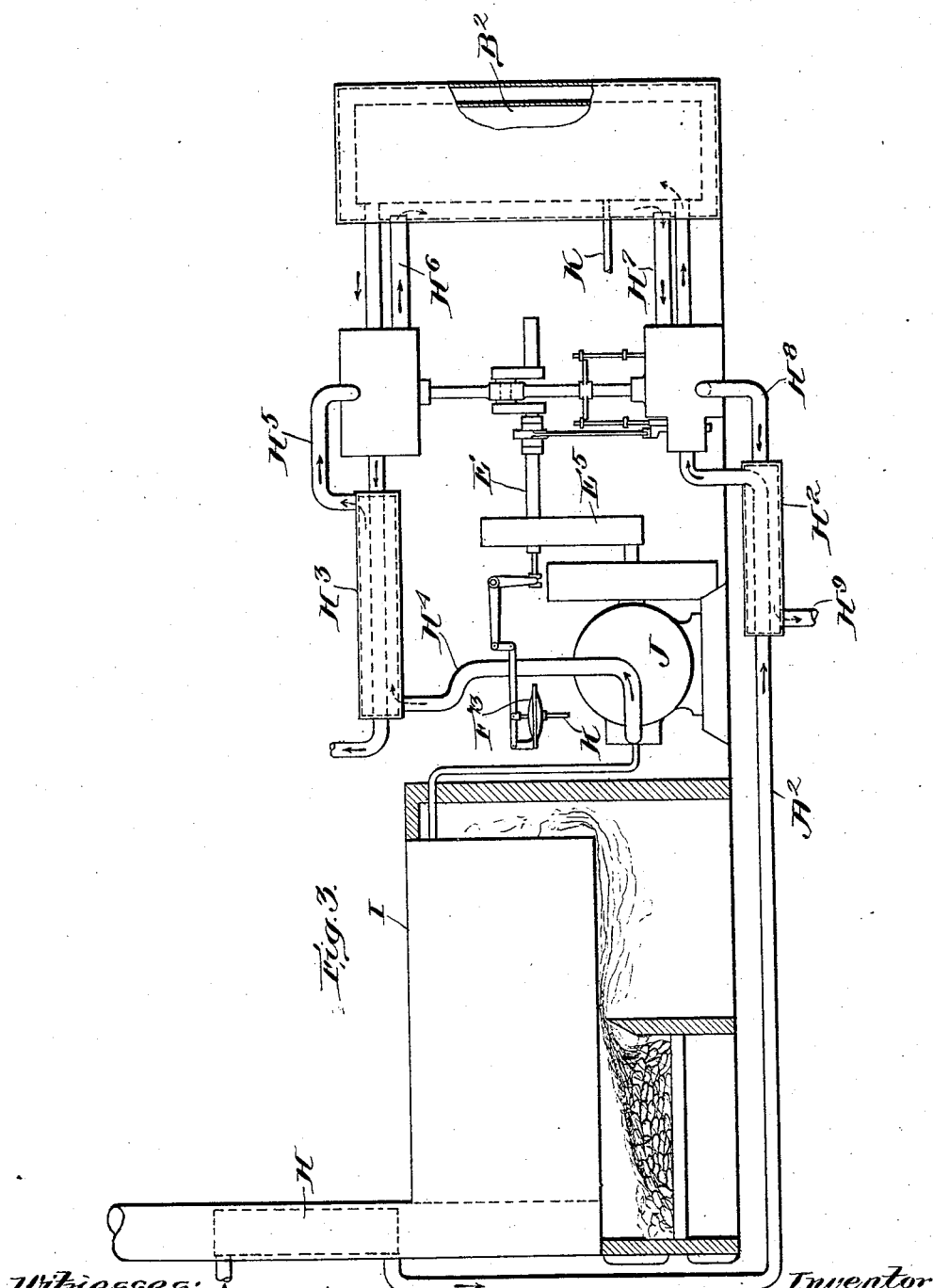

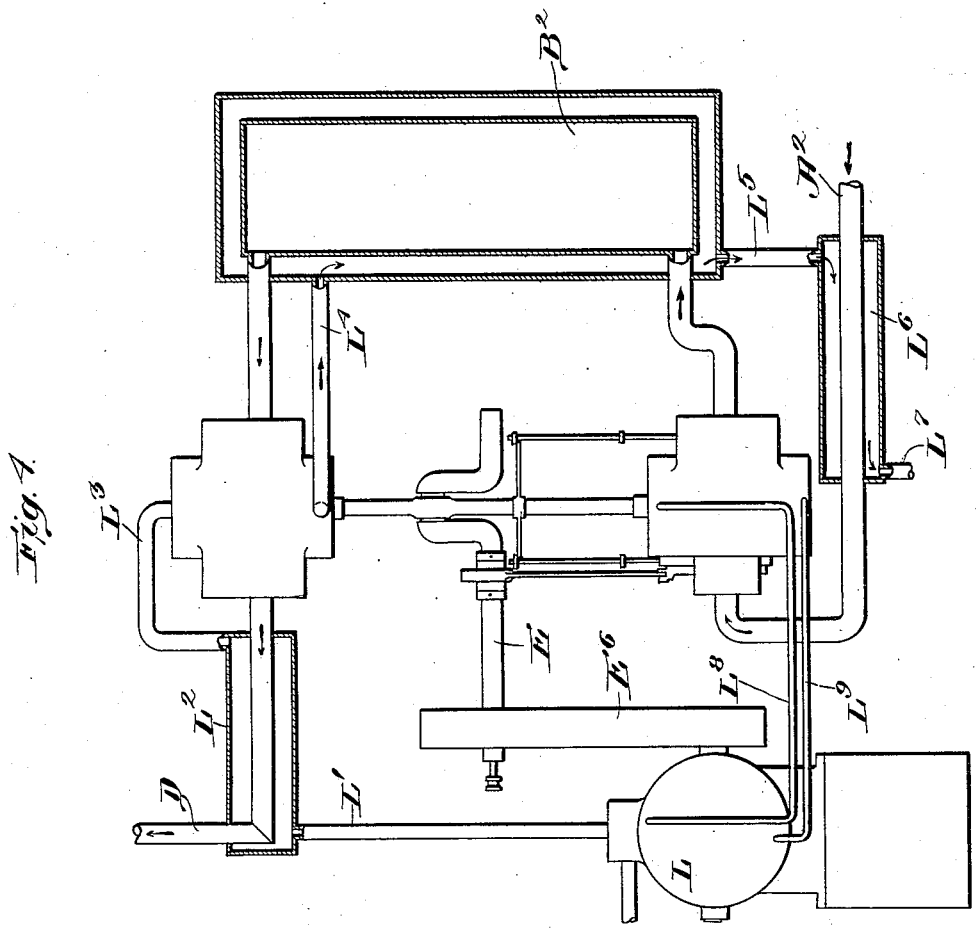

GUY B. COLLIER, OF KINDERHOOK, NEW YORK.

HEATING APPARATUS.

1,077,041.  Specification of Letters Patent.  Patented Oct. 28, 1913.

Application filed August 7, 1906. Serial No. 329,521.

*To all whom it may concern:*

Be it known that I, GUY B. COLLIER, citizen of the United States, and resident of Kinderhook, Columbia county, New York, have invented certain new and useful Improvements in Heating Apparatus, of which the following is a specification.

The invention relates to a heating apparatus in which the heat conveying or circulating medium is an elastic fluid such as air and in which the temperature of the fluid is raised to the degree required by first expanding the fluid and then compressing it, heat being supplied to the fluid between its admission to the expanding mechanism and its admission to the compressing mechanism so that the heating of the fluid is effected by doing a comparatively small amount of work thereon.

In practising the invention the air or other heat carrying fluid of the system is taken into an expanding mechanism where it is expanded and at the same time is subjected to heat so that the expansion is approximately isothermal and the expanded air is delievered at a temperature substantially the same as or above that at which it was taken in. The expanded air is then conducted to a compressing mechanism by which it is compressed to or slightly above atmospheric pressure and delivered to the place of use. In compressing the air a certain amount of heat is supplied to the air by reason of the work done thereon and the heat already in the air is also raised to a higher temperature level by reason of the compression. When operating through moderate temperature ranges the quantity of higher temperature heat which may be thus obtained is sufficient to enable heating to be done with economy even when steam or gas engines are employed to operate the compressing and expanding mechanism. In cases where such forms of motors are used the economy of the system may be materially increased by utilizing the waste heat from the motors in heating the air during expansion and the economy may be further increased by also utilizing the waste heat from the motors in raising the temperature of the air in various parts of the apparatus. The efficiency of the apparatus may also be increased by so connecting the expanding and compressing mechanisms that the expansion of the air in the expanding mechanism will assist in the operation of the compressing mechanism, thereby reducing the work to be done by the motor.

The heating of the air during expansion is an important factor in the efficiency of the apparatus since this results in the delivery of the expanded air to the compressing mechanism at a higher temperature level than it would otherwise be delivered and also reduces the work required to be done by the motor. The expanding air also rapidly absorbs heat from the waste products from the motor in case such products are used, thus contributing to the efficient utilization of the heat in such products.

For the purpose of illustration I have shown diagrammatically in the accompanying drawings, several heating plants each of which embodies some or all of the features of my invention.

The various features of the invention will be pointed out in the claims and will be readily understood from the following detailed description of the constructions shown in the drawings.

In the drawings Figure 1 is a diagrammatic view illustrating a system in which an electric motor is used for operating the expanding and compressing mechanisms. Figs. 2, 2$^a$, 2$^b$, are detail views of the governor for the expanding mechanism. Fig. 3 is a diagrammatic view showing a system in which the motor is a steam engine, and Fig. 4 is a diagrammatic view showing a system in which the motor is a gas engine.

In the apparatus shown in Fig. 1 the expanding mechanism is in the form of a cylinder A within which a piston A' reciprocates and to which the incoming air is supplied through a supply pipe A$^2$. The supply of air to the opposite sides of the piston is controlled by a main valve A$^3$ and cut-off valve A$^4$ which are operated to open and close the supply ports $a$ at proper intervals. The valves are so constructed and operated that during the travel of the piston in either direction, air will be supplied or taken in back of the piston for a portion of its stroke and then the cut-off valve will be operated to cut off the supply of air so that during the remainder of the stroke the air back of the piston will expand. During this stroke of the piston the air in front of the piston which has been expanded during the stroke of the piston in the opposite direction will be delivered through one of the delivery ports $a'$ which remains open during the entire stroke of the piston. The delivery ports $a'$ are openend and closed at the proper intervals by a valve indicated at $a^4$. The expanding cylinder A is jacketed and this jacket is supplied with a heating agent so that as the air expands it absorbs heat from the heating agent within the jacket and is delievered from the expanding cylinder at a temperature substantially the same or above that at which it was taken in.

The expanded air is conducted from the expanding cylinder A to a compressing mechanism through a conduit consisting of pipes B B' and an intermediate receiver $B^2$. During its passage from the expanding mechanism to the compressing mechanism the air is preferably heated and for this purpose the receiver $B^2$ is provided with a jacket $B^3$ through which the heating agent supplied to the jacket of the cylinder A passes on its way to the cylinder jacket.

In the apparatus being described the compressing mechanism consists of a cylinder C within which a piston C' reciprocates. The supply of air from the pipe B' to the cylinder C is controlled through valves $C^2$ and ports $c$. During the movement of the piston C' in one direction air from the pipe B' enters the cylinder back of the piston during its entire stroke. When the piston moves in the opposite direction the valve $C^2$ for that end of the cylinder closes and the air in front of the piston is compressed until the pressure in front of the piston is sufficient to open the delivery valve $C^3$ for that end of the cylinder, when the compressed air is delivered through this valve into the pipe D by which it is conducted to the place where it is to be used for heating purposes.

It is preferred to heat the air during compression and for this purpose the compressing cylinder C is jacketed and within this jacket is circulated a heating agent. This heating agent is preferably the same heat carrying agent which is circulated through the jackets for the receiver $B^2$ and the expanding cylinder A and is preferably led through the jacket of the compressing cylinder on its way to the jacket of the receiver.

By the action of the compressing mechanism the air is heated by reason of the work performed upon it and the comparatively low temperature heat in the air taken into the compressing mechanism is raised to a high temperature level so that the air delivered from the compressing mechanism at or slightly above atmospheric pressure contains a large quantity of heat at a temperature suitable for use in raising the temperature within buildings or for other heating purposes.

In order that the expansion of the air in the expanding mechanism may assist in effecting the compression of the air in the compressing mechanism, the expanding mechanism is so connected with the compressing mechanism that it supplements the action of the motor which drives the compressing mechanism. To this end the pistons A' and C' are connected with the same crank E in such manner that the expanding stroke of the piston A' occurs during the compression stroke of the piston C'. In the construction being described the crank shaft E' is driven through gearing $E^2$ from an electric motor $E^3$.

For the purpose of utilizing the heat developed in the running of the motor, which would otherwise be waste heat, the motor is surrounded by a hood $E^4$ and the intake pipe $A^2$ for the expansion cylinder leads from this hood. With this construction the incoming air is preheated by the waste heat of the motor and its temperature raised as it passes to the expanding mechanism, thus increasing the efficiency and economy of the apparatus.

In utilizing the apparatus for supplying heated air to be utilized in heating a building, the air should be delivered at the proper temperature to secure a substantially even temperature in the apartments which are heated. The range of temperature through which the expanded air must be raised by compression and therefore the amount of compression, will vary with the conditions under which the apparatus is used and therefore the degree of compression should be varied to suit the varying conditions. For instance, if the outside air is at a temperature of zero degrees, the amount of compression requisite in order that the air delivered by the compressor at substantially atmospheric pressure may have the desired temperature, will be greater than the amount of compression required in order that the air delivered by the compressor may have the same temperature if the outside air is at a materially higher temperature. The air should therefore in the former case be expanded to a greater extent than in the latter case.

In order that the apparatus may be regulated to suit the varying conditions under which it may be used, means are provided for varying the expansion produced by the expanding mechanism. After the apparatus has been adjusted to suit the existing conditions under which it is being used, its operation should be governed to maintain a substantially constant temperature at the place where the heated air is being utilized. To secure this result means are provided for governing the expanding mechanism and this governing means is preferably controlled by the temperature at the place of use of the hot air delivered from the compressing mechanism.

In the apparatus shown the regulation and governing of the apparatus is effected by regulating and governing the cutting off of the supply of air to the expanding cylinder and one form of means for adjusting and controlling this cut-off is indicated.

As indicated in the drawings the main supply valve $A^3$, as well as the exhaust valve $a^4$, are shifted at each end of the stroke of the piston $A'$ by means of tappets $A^6$ arranged to alternately engage collars $A^7$ secured to the valve rods $A^8$, $A^9$. The cut-off valve $A^4$ is operated by an eccentric F connected with the valve by an eccentric strap and rod $F'$. The eccentric is loosely mounted on the crank shaft $E'$ between collars $F^2$. The eccentric is connected to revolve with the shaft by means of a lug $F^3$ formed on the end of a rod $F^4$ which is mounted within the shaft $E'$, the lug projecting radially through a slot $F^5$ in the shaft $E'$ and engaging a spiral groove $F^6$ formed in the bore of the eccentric. So long as the rod $F^4$ remains in fixed position longitudinally of the shaft, the eccentric will remain in fixed relation to the shaft thus operating the cut-off valve to cut off the supply of air to the compression cylinder at a definite point in the stroke of the piston. If the rod $F^4$ is shifted longitudinally of the shaft E the lug $F^3$ working in the spiral groove $F^6$ will shift the eccentric about the shaft $E'$ thus varying the point of cut off. The rod $F^4$ projects beyond the end of the shaft $E'$ and is connected by means of collars $F^7$ and a pin $F^8$ with one end of a bell-crank lever $F^9$. The other end of the bell-crank lever is connected by means of an adjustable link $F^{10}$ with the free end of a lever $F^{11}$. The lever $F^{11}$ is connected by a rod $F^{12}$ with a flexible diaphragm within the casing $F^{13}$ and the position of the lever $F^{11}$ and therefore of the connected rod $F^4$ is governed by the position of the diaphragm within the casing $F^{13}$.

In case the expanding mechanism is to be controlled by the temperature within the apartment to which the air from the compressing mechanism is delivered, the chamber within the casing $F^{13}$ below the diaphragm is connected by a pipe $F^{14}$ with a thermostat indicated at $F^{15}$ which regulates the pressure acting against the diaphragm according to the temperature of the apartment or apartments within which the thermostat or thermostats are located. The arm $F^{11}$ may be provided with a weight $F^{16}$ which may be adjusted to balance the pressure on the under side of the diaphragm corresponding to the temperature which it is desired to maintain at the thermostats. When there is a variation in temperature at the thermostats there will be a variation in the pressure on the diaphragm within the casing $F^{13}$ and the lever $F^{11}$ will move in one direction or the other to vary the cut off for the expansion cylinder, thus varying the amount of expansion and compression of the air passing through the apparatus and consequently varying the temperature level of the air delivered from the compressing mechanism, the temperature of the air being increased in case the temperature at the thermostat drops and being decreased in case the temperature at the thermostat rises.

By adjusting the link $F^{10}$ the eccentric F may be set with relation to the governing mechanism to adjust the cut off of the expanding mechanism for the conditions under which the apparatus is operating at any given time. After the cut off has been thus adjusted the governing mechanism will act to vary the cut off and maintain the proper temperature at the thermostat.

The heating agent which is circulated through the jackets of the compression cylinder, receiver and expansion cylinder, may be provided in any suitable manner which may be found to be the most economical and desirable and may be supplied to the jacket of the cylinder C through a pipe G led from this jacket to the jacket $B^3$ of the receiver, through a pipe $G'$ and thence to the jacket of the cylinder A, through a pipe $G^2$ and discharged through a pipe $G^3$. By leading the heating agent through the jackets in this manner it is passed through the jacket to the cylinder C when its temperature is highest and where the temperature of the air being acted upon is the highest and is passed through the jacket of the cylinder A after some of its heat has been absorbed and its temperature has therefore fallen but while it is still at a sufficiently high temperature to impart heat to the cooler air in the expanding cylinder. This results in an efficient and economical use of the heat carried by the heating agent.

In Fig. 3 an apparatus is illustrated in which the expanding and compressing mechanisms are driven from a steam engine, the shaft E being connected to the shaft of the engine through a belt $E^5$. In the apparatus here shown the incoming air on its way to the expanding mechanism, passes through a heating device H where its temperature is raised by the waste products of combustion from the steam boiler I which furnishes the steam for the driving engine J. The air passes from the heating device H through the intake pipe $A^2$ where its temperature is further raised by a heating device $H^2$, the heating agent for which is supplied by the exhaust from the engine. The high temperature air delivered from the compressing mechanism is subjected to the action of a heating agent in a heating device $H^3$ and its temperature raised to a higher level. In this construction the heating agent which is passed through the heating devices $H^3$ and $H^2$, and the heating agent which is passed through the jackets of the compression cylinder, receiver and expansion cylinder, is the exhaust steam from the engine. In order to utilize the heat of the exhaust steam from the engine in the most effective manner, the exhaust steam is first led to the heating device $H^3$ through the pipe $H^4$, thence through the pipe $H^5$ to the jacket of the compression cylinder, thence through a pipe $H^6$ to the jacket of the receiver $B^2$, thence through a pipe $H^7$ to the jacket of the expansion cylinder, and thence through a pipe $H^8$ to the heating device $H^2$ from which it is exhausted through a pipe $H^9$. The expanding and compressing mechanisms in this apparatus are shown of the same construction and mode of operation as the expanding and compressing mechanisms of the apparatus shown in Fig. 1 and the same form of governing mechanism for governing the operation of the compression mechanism is also shown in connection with this apparatus. This governing mechanism may be controlled by thermostats as indicated in the illustration in Fig. 1. It may be found desirable, however, in the apparatus shown in Fig. 3, or in a system driven by an electric motor as in Fig. 1, to control the governing mechanism in various ways. For instance, it may be found desirable to so control the governing mechanism that the temperature of the air delivered from the compressing mechanism is substantially constant. In such case the governor might be controlled directly by the temperature through the use of a suitable thermostat or the governor may be controlled through the pressure in the receiver $B^2$. The temperature of the air delivered by the compressing mechanism, other conditions remaining constant, depends upon the amount of compression effected by the compressing mechanism. If a constant pressure is maintained therefore in the receiver $B^2$ from which the compressing mechanism is supplied with air, the temperature of the air delivered by the compressing mechanism, will remain constant. By controlling the governing mechanism for the expansion mechanism therefore, by the pressure in the receiver $B^2$ so that a constant pressure is maintained in the receiver, the apparatus will be governed to insure that the air delivered will be of substantially a uniform temperature. The governing mechanism may be thus controlled by connecting the chamber in the casing $F^{13}$ below the diaphragm in said casing, with the receiver $B^2$ through a pipe K.

In Fig. 4 an apparatus is shown similar to that shown in Figs. 1 and 2, in which the expanding and compressing mechanisms are driven by a gas engine. The engine for driving the expanding and compressing mechanisms is indicated at L and the shaft of the engine is connected with the crank shaft E through a belt $E^6$. In an apparatus in which the motor is a gas or hydrocarbon engine, the waste heat of the motor may be economically utilized in the manner indicated. In this apparatus the hot exhaust from the engine is delivered through a pipe L' to a heating device $L^2$ where it acts to raise the temperature of the air as it comes from the compressing mechanism through the pipe D. From the heating device $L^2$ the exhaust products are led through a pipe $L^3$ to the jacket of the compression cylinder, thence through a pipe $L^4$ to the jacket of the receiver $B^2$, thence through a pipe $L^5$ to a heating device $L^6$ where it acts to raise the temperature of the incoming air as it passes through the intake pipe $A^2$. From the heating device L the exhaust products are discharged through a pipe $L^7$. When using a motor of the character used in the apparatus being described, the waste heat of the motor absorbed by the water passing through the water jacket of the combustion cylinder, may be utilized with advantage in heating the air as it is expanded in the expansion cylinder A. The water circulating through the water jacket of the motor may be led to and from the jacket of the compression cylinder through pipes $L^8$ and $L^9$. The water passing through the jacket of the motor absorbs heat and as the water passes through the jacket of the expansion cylinder, this heat will be absorbed by the air which is expanding in the expanding chamber, the cooler water being returned to the jacket of the motor.

It will be understood that the specific construction of the expanding and compressing mechanisms and of the various devices and mechanisms forming parts of the apparatus, are not material and that the mechanisms and devices shown in the drawings are shown merely for the purpose of illustration and that the illustration is to a great extent diagrammatical. It will also be understood that the air delivered by the apparatus may be utilized by discharging it directly into the apartment to be heated, as indicated in Fig. 1, or may be passed through radiators or otherwise used in heating apartments or may be used for other heating purposes.

Without attempting to point out in detail the various constructions and arrangements in which the features of my invention may be embodied, what I claim and desire to secure by Letters Patent is:—

1. A heating apparatus comprising fluid expanding mechanism, provided with means for heating the fluid during expansion, a fluid compressing mechanism, a conduit for the fluid between the expanding and compressing mechanisms, a governor for the expanding mechanism, and a thermostat for controlling the governor.

2. A heating apparatus comprising mechanism for expanding the fluid, mechanism for compressing the fluid, a conduit for conducting the fluid from the expanding to the compressing mechanism, a conduit for conducting the fluid from the compressing mechanism to the place of use, means for adjusting the apparatus to vary the amount of compression, a governing mechanism for governing the apparatus to maintain a substantially constant temperature at the place of use to which the fluid is conducted from the compressing mechanism.

In witness whereof, I have hereunto set my hand, this 3rd day of August 1906.

GUY B. COLLIER.

In the presence of—
 NATHANIEL B. WALES,
 IRA L. FISH.

Copies of this patent may be obtained for five cents each, by addressing the "Commissioner of Patents, Washington, D. C."